(12) United States Patent
Boultis

(10) Patent No.: US 8,614,410 B2
(45) Date of Patent: Dec. 24, 2013

(54) DIFFRACTION FIELDS FOR GUIDING AN OBJECT TO A TARGET

(71) Applicant: Ioannis Boultis, Salonika (GR)

(72) Inventor: Ioannis Boultis, Salonika (GR)

(*) Notice: Subject to any disclaimer, the term of this patent is extended or adjusted under 35 U.S.C. 154(b) by 0 days.

(21) Appl. No.: 13/892,936

(22) Filed: May 13, 2013

(65) Prior Publication Data

US 2013/0253883 A1      Sep. 26, 2013

Related U.S. Application Data

(63) Continuation of application No. 12/955,622, filed on Nov. 29, 2010, now Pat. No. 8,466,398.

(60) Provisional application No. 61/344,391, filed on Jul. 12, 2010, provisional application No. 61/264,884, filed on Nov. 30, 2009.

(51) Int. Cl.
*G01C 21/02* (2006.01)

(52) U.S. Cl.
USPC .................................... 250/203.1; 250/203.2

(58) Field of Classification Search
USPC .............................. 250/203.1, 203.2; 342/118
See application file for complete search history.

(56) References Cited

U.S. PATENT DOCUMENTS 8,466,398 B2 * 6/2013 Boultis ...................... 250/203.1

* cited by examiner

*Primary Examiner* — Thanh Luu
(74) *Attorney, Agent, or Firm* — Oliff & Berridge, PLC

(57) ABSTRACT

An object moving towards a target with a velocity can be accurately estimated and targeted based on keeping the object within a field of diffraction, the object being disturbed by effects caused by noise.

8 Claims, 13 Drawing Sheets

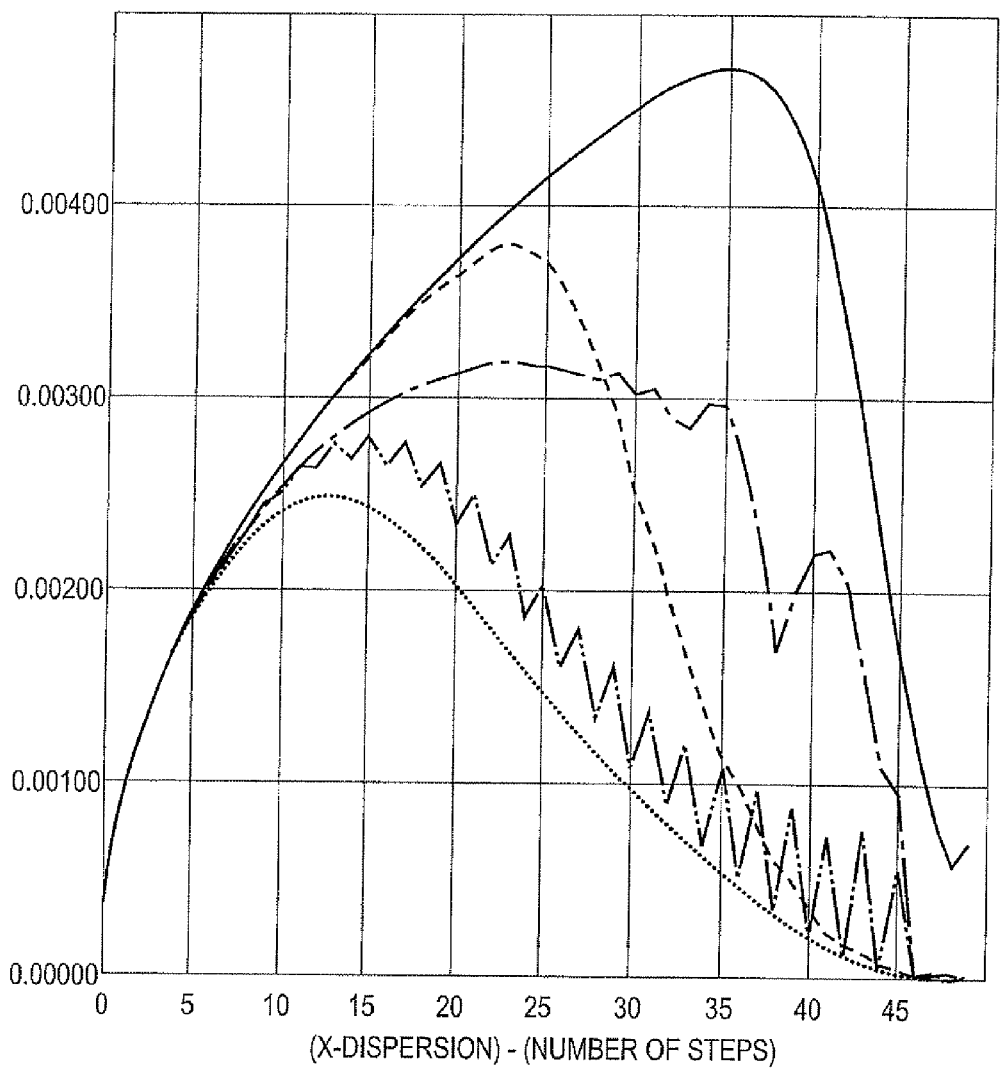

DIFFRACTION FIELDS FOR GUIDING AN OBJECT TO A TARGET

This is a Continuation of application Ser. No. 12/955,622 filed Nov. 29, 2010, which claims the benefit of U.S. Provisional Applications No. 61/264,884 filed Nov. 30, 2009 and No. 61/344,391 filed Jul. 12, 2010. The disclosure of the prior applications is hereby incorporated by reference herein in its entirety.

BACKGROUND

In the art of predicting how an object hits a target, several models have been proposed, such as classical motion. The accuracy of any prediction is affected by random noise, thus making models using only classical motion, and the equations used to determine classical motion, insufficient to accurately predict how an object projected towards a target reaches the target.

SUMMARY

The exemplary embodiments are directed to a method of using a source wave generated in relation to an object, the object being disturbed by noise and projected at a target, to more accurately predict the motion of an object, and guide the object, towards the target.

More specifically, the exemplary embodiments are directed to a source that generates a wave. The wave may be reflected off an object moving through a pathway toward a target. The pathway may be defined by a motion equation, such as classical motion. A diffraction field may be created by the target. Subsequently a measurement of the intensity of the diffraction field may be used to modify at least one factor used in the motion equation of the classical motion to more accurately guide the object to a target.

A set of factors used in determining the motion equation for this model can be at least a x-dimension, a y-dimension, a z-dimension, velocity in the x-direction, velocity in the y-direction and velocity in the z-direction, with each of the factors being influenced by noise. The noise may be modeled by the use of stochastic systems, with a known noise density such as Gaussian distributions.

In an embodiment, measurements of the intensity of the diffraction field may be used to modify more than one factor used in the motion equation to more accurately guide the object to a target.

In an embodiment, a moving source may generate the wave reflected off the object moving through the pathway.

In an embodiment, the moving source moves with a known velocity.

In an embodiment, the source moves with a translational velocity through the pathway defined by classical motion. The wave using the target may create a diffraction field while keeping the orbit of the object within the target's orbit, and the measurements of the intensity of the diffraction field may be used to modify more than one factor used in a motion equation to more accurately guide the object to the target.

In an embodiment, the source moves with a velocity of constant magnitude and arbitrary direction.

In an embodiment, may have a radius based on an unknown function of time, and may be a random variable with uniform density, the wave using the target may create a diffraction field, and subsequently using measurements of the intensity of the diffraction field to modify more than one factor used in the motion equation to more accurately guide the object to a target.

In an embodiment, the target may move to an unknown position with an unknown velocity, the wave using the target may create a diffraction field, and subsequently using measurements of the intensity of the diffraction field to determine the unknown velocity and position of the target.

In an embodiment, a source with a known position may be used.

In an embodiment, a source with an arbitrary position may be used.

BRIEF DESCRIPTION OF THE DRAWINGS

The exemplary embodiments will be further described with reference to the following drawings, wherein:

FIG. 13 is a graphical depiction of computer-generated results for an embodiment of this application.

DETAILED DESCRIPTION OF EMBODIMENTS

Figure 1:
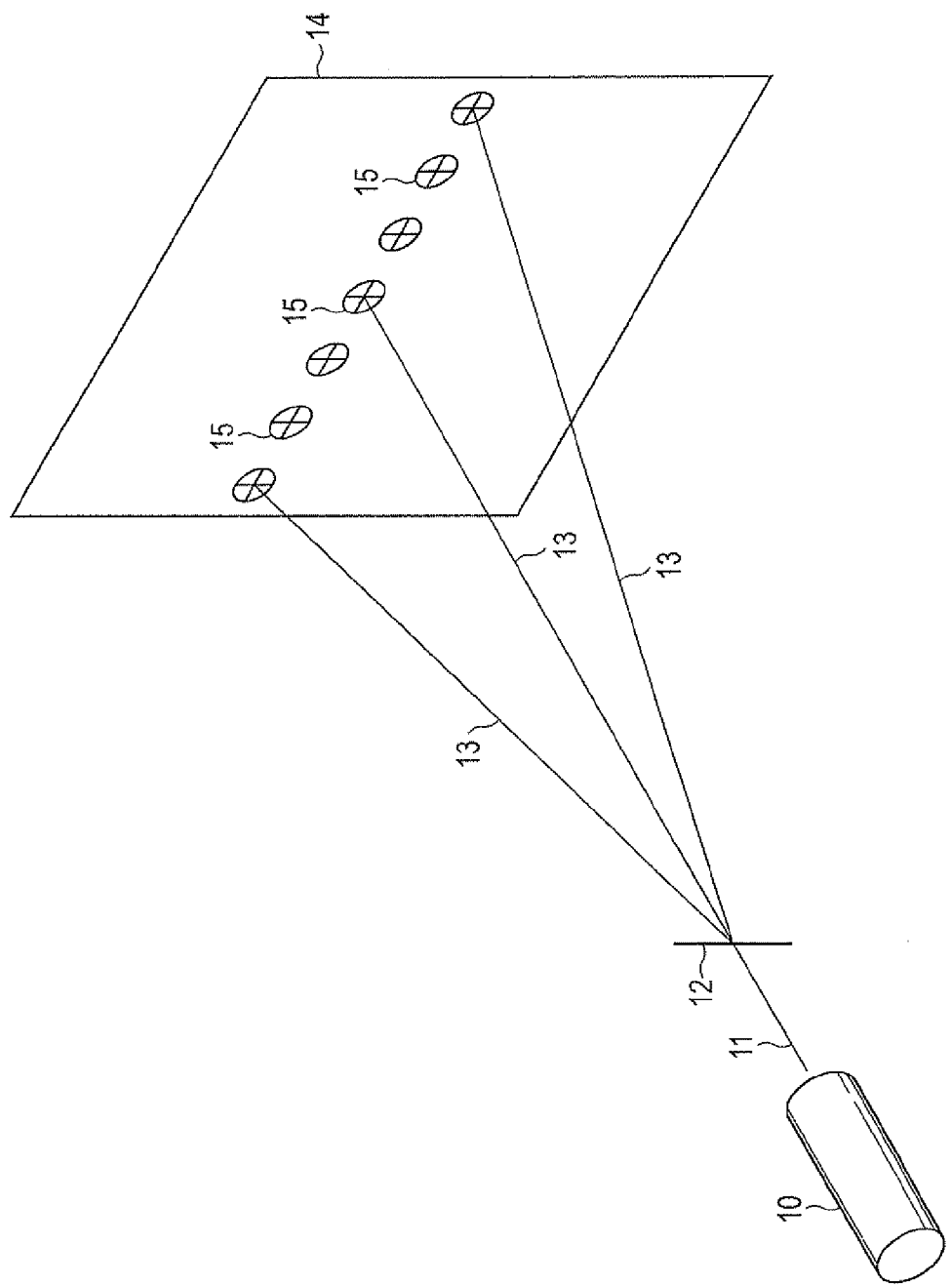
FIG. 1 illustrates an example of a simple diffraction pattern.

Referring to the example shown in FIG. 1, a diffraction patterns creation is illustrated. A laser 10 may project a laser beam 11 onto a hair 12. The laser beam 11 projected onto the hair 12 may create diffracted laser rays 13. The diffracted laser rays 13 each may create a diffraction pattern 15 on a wall 14. For example, if the hair 12 is of a thickness of about 0.2 millimeters, and the distance between the hair 12 and the wall 14 is about 5 meters, a diffraction pattern 15 with intervals of about 0.5 meters (total interval, of all lighted regions, circles with cross, and dark regions, were there are no diffracted rays, is about 0.5 meters) may be created on a wall 14. Although in this embodiment a laser in connection with a hair to create diffraction patterns, it is envisioned that any object can be used without departing from the scope of the invention. Furthermore, although a laser source is used in this embodiment, it is envisioned that any device that emits a wave through any disturbance that travels through a medium can be used.

Figure 2:
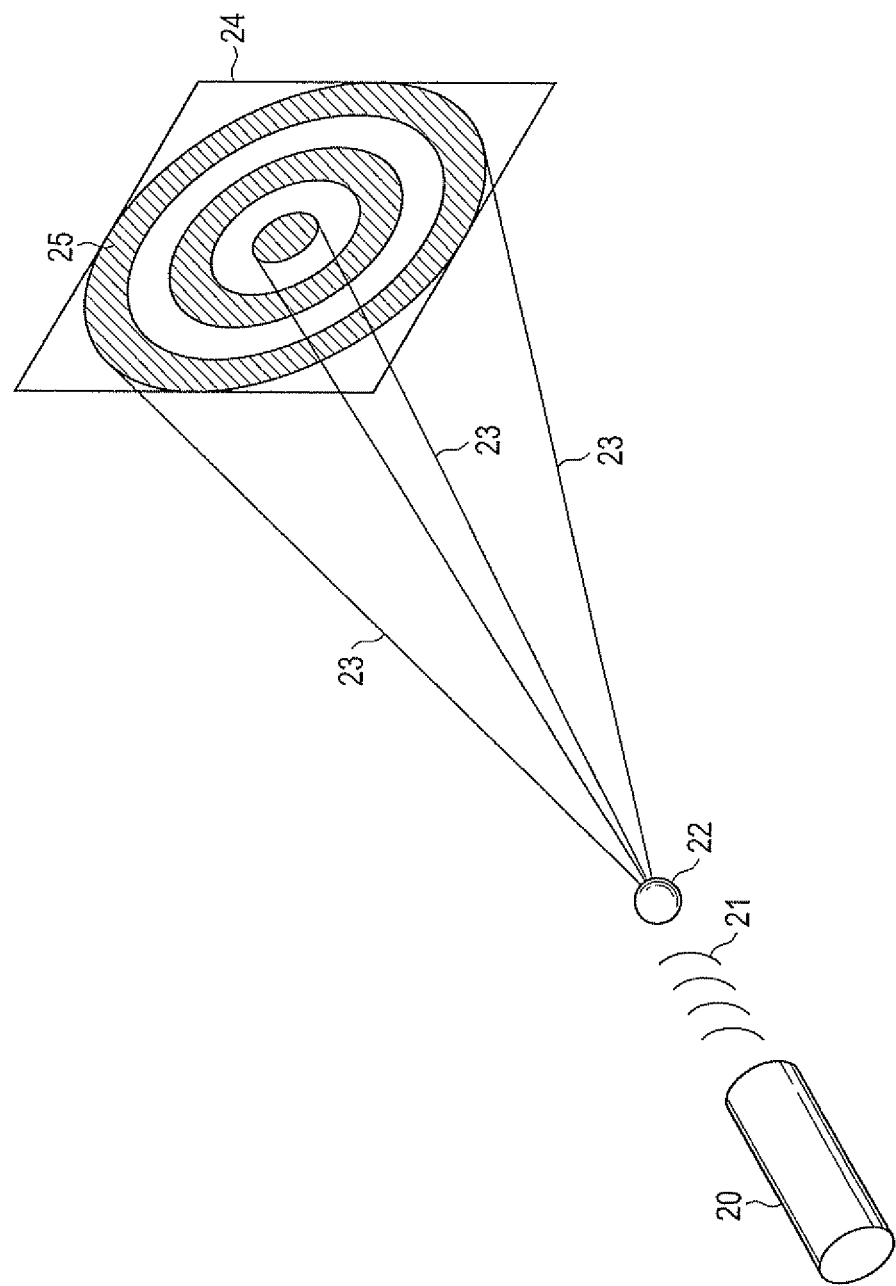
FIG. 2 illustrates an example of a simple diffraction pattern caused by a sphere.

For example, referring to the example shown in FIG. 2, a diffraction patter may be created with a wave source. In this embodiment, the object 22 is spherical. However, the object 22 may take on several shapes and sizes. The wave 21 projected onto the object 22 may create diffracted waves 23. The diffracted waves 23 may create a diffraction pattern 25 on a surface 24.

Figure 3B:
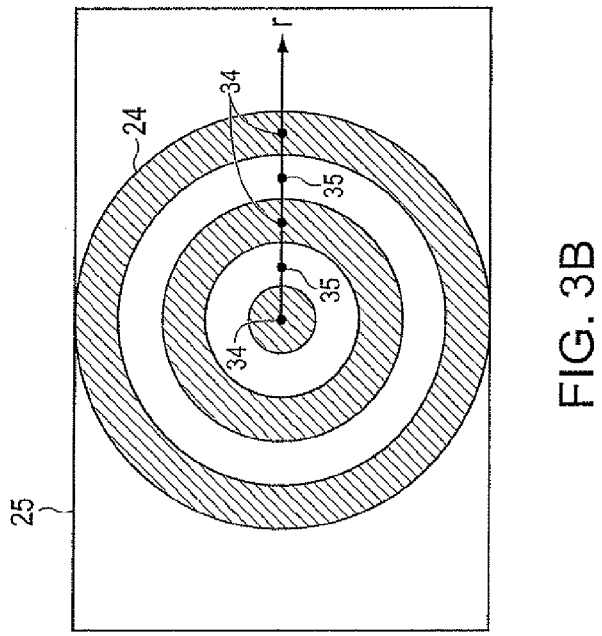
FIGS. 3A and 3B illustrates an example of how field intensity relates to a simple diffraction pattern caused by a sphere.
Figure 3A:
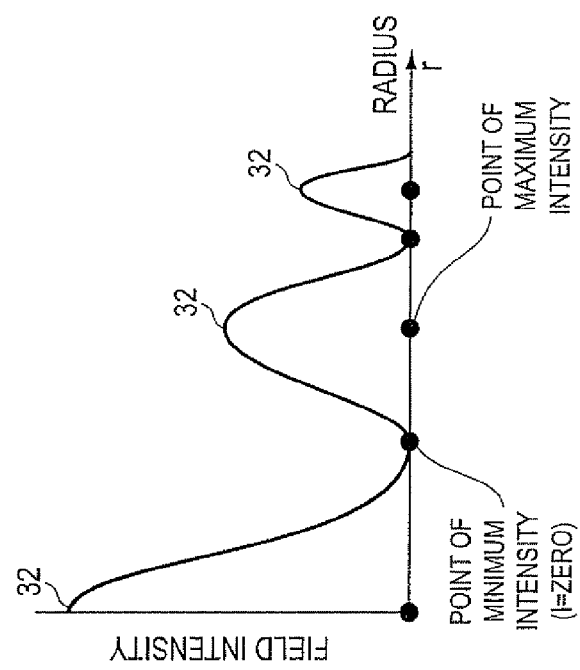

Referring to FIGS. 3A and 3B, a graph in FIG. 3A shows a field intensity of the waves 23 plotted versus a radius of the of the corresponding diffraction pattern 25. On the graph, the maximum peaks 32 of the field intensity correlate with the peaks of field intensity 34 of the diffraction pattern 24. Minimum points 33 of the field intensity correlate with minimum peaks of field intensity 35 of the diffraction pattern 25. An analysis for estimating motion may be performed within a cone corresponding to the maximum intensity. When estimations of motion are done within a cone corresponding to the maximum intensity, it can be shown that targeting of an object to a target may be highly accurate and precise.

Figure 4:
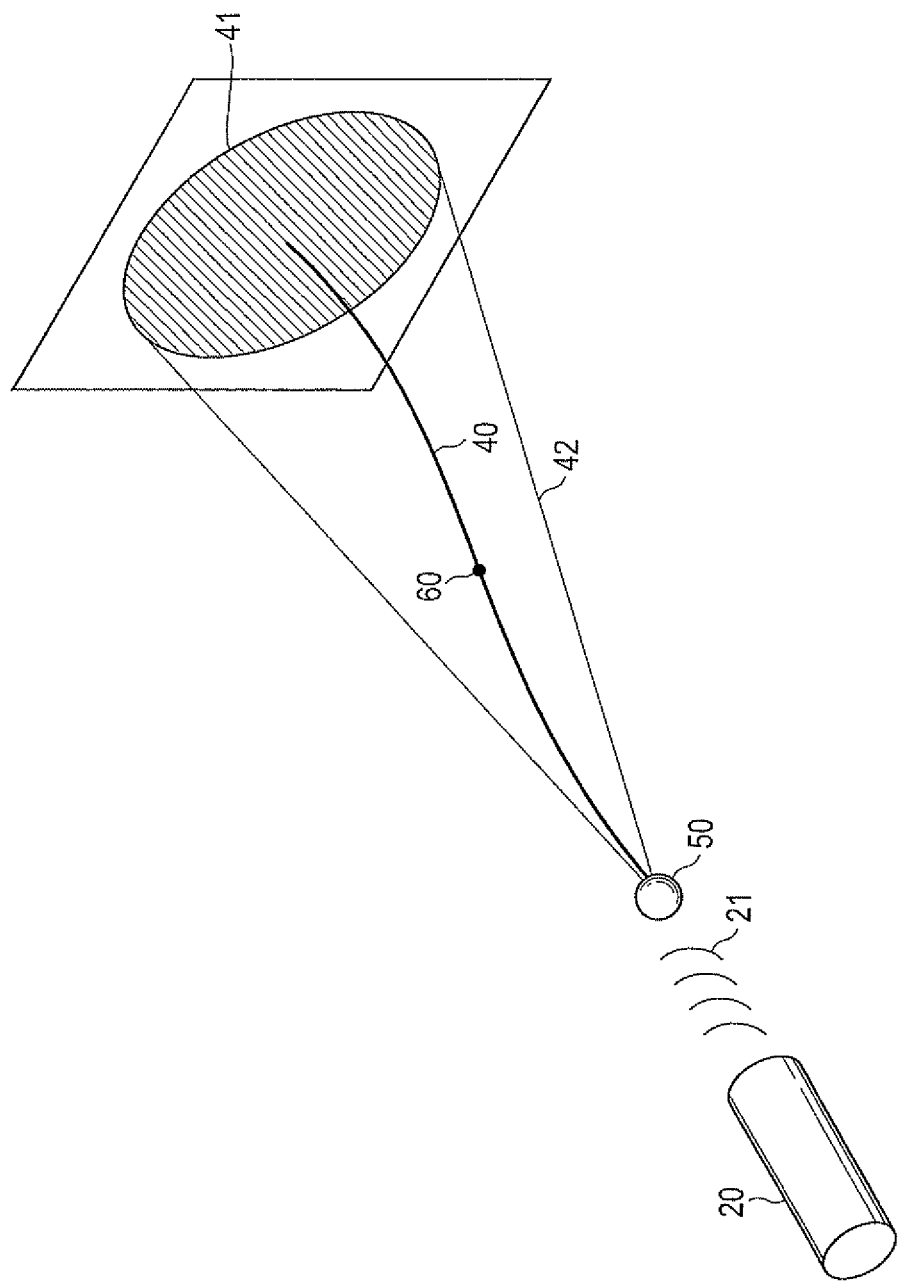
FIG. 4 illustrates an example of an object targeted within a diffraction field caused by the target.

Referring to FIG. 4, the wave source 20 projects a wave 21 onto the object 50, with object 50 creating a portion 41 of diffraction cone 42, with path 40 inside the diffraction cone 42. The portion 41 of the diffraction cone 42 is a section of the diffraction cone 41 with a vertex (the object 50) and a plane, vertical to the cone axis. The path 40 represents a path of a projectile 60 having classical motion that is aimed and makes contact with object 50. The path 40 may be disturbed by various noise factors that may be present in a system, thus making the system stochastic. The estimations may be done with the path 40 being within a diffraction cone 42. Based on experimental results, as shown in the experimental results section, when the path 40 is within the diffraction cone 41, the prediction of the path 40 and the targeting becomes highly improved.

Figure 5:
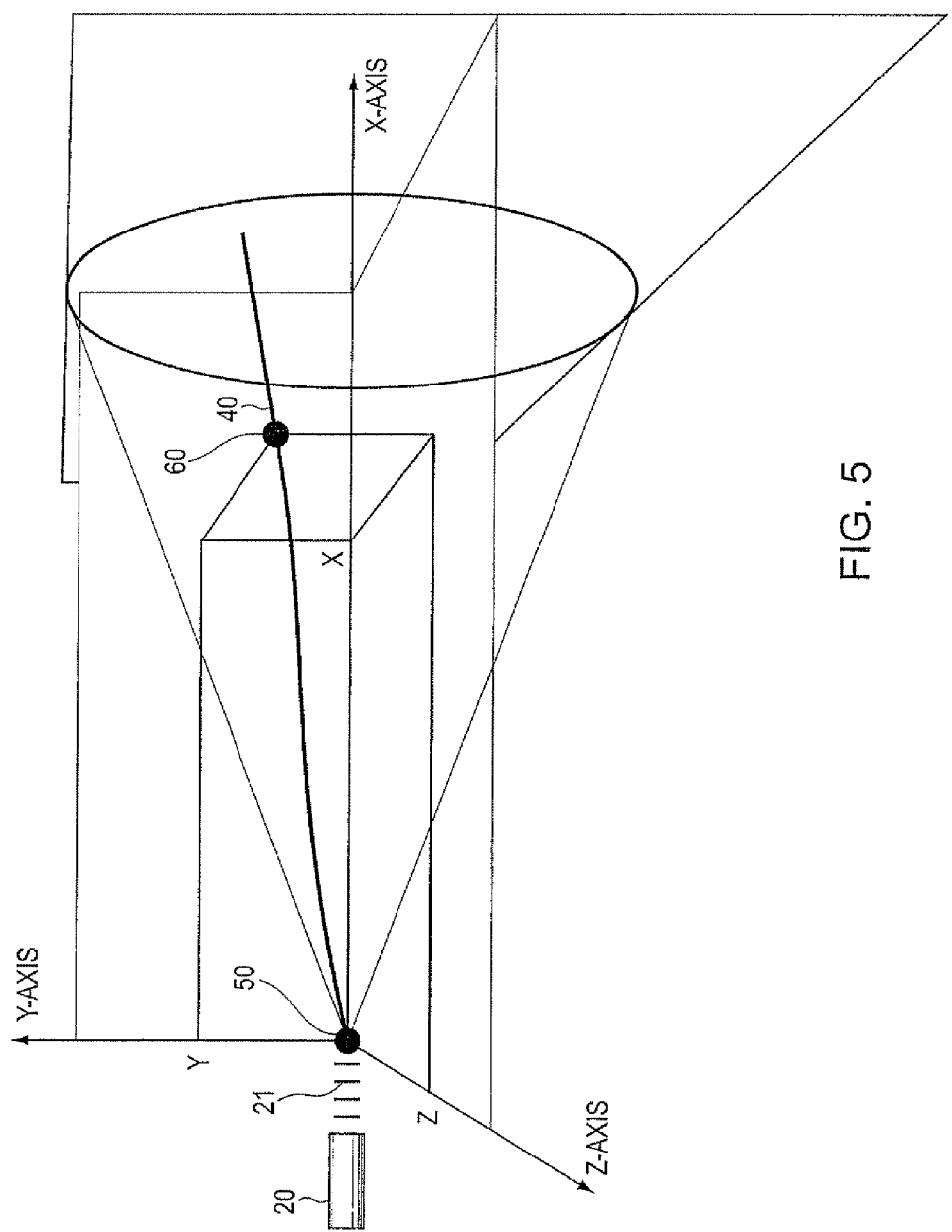
FIG. 5 illustrates an example of an object at an arbitrary position within a diffraction field caused by a target.

As shown in FIG. 5, with a known velocity of the target 50 and a known intensity of the diffraction field associated with the diffraction cone 41, created by the wave 21 and the target 50, the position and the velocity of the projectile 60 at a given time may be estimated with accuracy when a path utilizing classical motion is perturbed by noise. The path 40 represents the classical path projectile 60 makes in order to hit the target 50. The target 50 is at the origin of an x, y and z coordinate system.

Classical motion is defined (but not limited to) "classical" movement in a non-stochastic system (i.e., an equation with no random disturbances), calculated by the use of a model deriving simple motion. Some examples of classical motion, but not limited to, are quadratic motion, Isaacs solution of a chase problem (Isaacs motion) and a simple straight line approach to the target (line motion).

The stochastic system used to model the motion of the projectile 60 in accordance with the exemplary embodiments can be defined by the following equations:

$$X(n+1) = X(n) + dt \cdot V(n) + dt \cdot N1 \tag{1.1}$$

$$V(n+1) = V(n) + dt \cdot U(<X(n)>, <V(n)>) + dt \cdot N2 \tag{1.2}$$

$$Xm(n+1) = F(X(n+1)) + N3, F(x) = I(x) \text{ or } \text{grad} I(x) \tag{1.3}$$

$$Vm(n+1) = V(n+1) + N4 \tag{1.4}$$

where X is a position coordinate at a time n and V is the corresponding velocity at the same time n. N1, N2, N3 and N4 are noise disturbances. U is an arbitrary control function with randomness caused by noise associated with the calculation and solving of the function. In the above equations, 'dt' is a scalar parameter. Other stochastic systems may also be introduced.

Further, $<X(n)>$, $<V(n)>$ are the most probable values calculated at step n. Xm and Vm are measured quantities based on the intensity of the diffraction field at various points n. The intensity of the diffraction pattern may be calculated by various formulas (for example, as shown in several of the following embodiments, the Fraunhoffer-diffraction formula), and is represented by I(x) (i.e. the intensity of the diffraction pattern of a spherical body). Thus, because of the above relationships, using a non-random control function for solving U may simplify a numerical calculation associated with the above stochastic system. Thus, by using a non-random control function an advantage of requiring less processing ability for gathering information and data associated with various paths of motion may be achieved.

In order to describe the intensity of a diffraction field (Ix), the following equation may be used:

$$I = Io \left( \frac{2 \Im_1 (\rho \kappa \sin(\theta))}{\rho \kappa \sin(\theta)} \right)^2 \tag{1.5}$$

$$Io = (C \pi \rho^2)^2$$

$$C^2 = A^2/(rs)^2$$

$$\tan(\theta) = y/x$$

The following variables in the above equation are now defined:

r is the distance from the wave source 20 of the field to the target 50, s the distance from the target 50 to projectile 60 at point (x, y), (x,y), Io is a number function with variables (C, ρ), $\Im$ is a first order Bessel function, θ is defined as an angle that forms the line that connects the target 50 and the projectile 60 with respect to the horizontal axis, C is defined as a number function of variables (r, s), A is defined as scalar, amplitude of a spherical wave, that the source emits, y is defined as a vertical position coordinate, and x is defined as a horizontal position coordinate.

Thus, if the projectile 60 has reaches the target 50, the coordinate used above would be (0,0), i.e. the origin.

A further calculation used in several of the embodiments is the calculation of modal orbits as represented by conditional probability densities. The conditional probability densities may be calculated using the following equations:

$$Pn(x(n)|\text{measurements up to time } n),$$

$$Pn(v(n)|\text{measurements up to time } n) \tag{2.1}$$

The above probability densities are calculated using iteration formulas:

$$Pn(z(n) \mid M(n)) = \frac{1}{Nn} Qn(zm(n) \mid z(n)) \cdot Fn(z(n)) \tag{2.2}$$

$$Fn(z(n)) = \int dz(n-1) \cdot IIn(z(n) \mid z(n-1)) \cdot Qn - \tag{2.3}$$

$$1(zm(n-1) \mid z(n-1)) \cdot Fn - 1(z(n-1))$$

$$F1(z(1)) = \int dz(0) \cdot \text{of } II1(z(1) \mid z(0)) \cdot P0(z(0) \mid M(0)) \tag{2.4}$$

where
Nn:=normalization factor
z(n):=(x(n), v(n))
zm(n):=(xm(n), vm(n))
M(n):=(xm(n), xm(n−1), . . . , xm(0); vm(n), vm(n−1), . . . , vm(0)), In the above equation, the following variable are defined:

$z(n)$ is defined as a set of the system's random variables at time n,

M(n) is defined as the set of all measurements up to time n, xm(n) is a number that results from measurements at time n, for example field intensity or its gradient, vm(n) is the number that results from velocity measurements, Nn is defined as a scalar that normalizes probability densities so that the total probability has a value equal to the number one, Qn is a function that is used in the iteration formula, and zm(n) is defined as the set of measure random variables, at time n.

This particular iteration method is chosen because it may be done numerically using limited space allocated in a computer memory. The numerically calculated conditional probabilities for various motion equations are represented by the following relationships:

$$Pn(x(n)|M(n))$$

$$Pn(v(n)|M(n))$$

Once the probabilities are solved for, the probabilities can then be used to calculate a Gaussian fitting directed to the discrete results, thus obtaining dispersion values of various distributions based on the randomness modeled by use of the Gaussian noise components. The above conditional densities and general quantities related to the above stochastic system are referred to as "modal" quantities. A mathematical procedure used to obtain these probability densities is characterized by the following equations:

$$Pn(x(n), v(n), N1(n), N2(n)) = Pn(x(n), v(n)) \cdot P(N1(n)) \cdot P(N2(n)) \quad (2.5)$$

$$X(n+1) = X(n) + dt \cdot V(n) + dt \cdot N1(n) \quad (2.6)$$

$$V(n+1) = V(n) + dt \cdot U(n) + dt \cdot N2(n) \quad (2.7)$$

$$X(n) = X(n) \quad (2.8)$$

$$V(n) = V(n) \quad (2.9)$$

Thus, using equation 2.5 with equations 2.6-2.9 the following relationship may be derived:

$$\Pi n+1(x(n+1),v(n+1),x(n),v(n))=\Pi n(x(n),v(n),N1(n)=(x(n+1)-x(n)-dt.v(n))/dt, N2(n)=(v(n+1)-v(n)-dt.U(n))/dt) \quad (2.10)$$

The determinant of the above transformation has an absolute value of $dt^2$; however, because the densities used are not normalized, except for the probabilities Pn(x(n)|M(n)) and Pn(v(n)|M(n)), a constant associated with the relationship in equation 2.10 may be ignored.

Based on the above equations and relationships, one can obtain the following by summing the appropriate variables:

$$\Pi n+1(x1(n+1),v(n+1)) \text{ or } \Pi n+1(x(n),v(n))| \quad (2.11)$$

The above described modal probabilities may be calculated using fixed measurements equaling classical motion. For the purpose of simplifying measurements, a classical orbit associated with the classical motion that has two position coordinates may have a second coordinate represented by a non-random variable (as used in various equations presented, such as the field measurement function).

A classical orbit that may be used in a two dimensional position space may be obtained by the following. First, a motion in one dimensional space, referred to as vertical, is derived by a quadratic control function, where one attempts to reach a zero value in a two dimensional/position-velocity (x, v) system. When attempting this, costs are minimized in velocity and distance in reaching the final target. This classical motion is known as "quadratic motion," and may be used to model a point-object that moves in two dimensional space. Quadratic motion may also be used to model a point-object in three dimensional space, with the space having a cylindrical symmetry.

In addition to quadratic motion, a model based on two dimensional isotropic association, with orbits called "isaacs motion," may alternatively be used. Further, a model based on orbits of a constant velocity system called "line motion," may also be used. The orbits of a system using the following equation may also be used (which drives a system to (x, v)=(0,0) in two steps:

$$X(n+1)=X(n)+dt \cdot V(n)$$

$$V(n+1)=V(n)+dt \cdot U(n) \quad (3.1)$$

where $U(2m)=-X(2m)/dt^2-2 \cdot V(2m)/dt$ $U(2m+1)=-V(2m+1)/dt$

In the above equation, the function U( . . . ) is used to calculate a correction term that can drive the system back to a zero vertical position and zero vertical velocity, since noise results in a deviation from these points. These equations may be useful in cases where the system moves near the horizontal axis, thus where the vertical position is zero with zero vertical velocity, and thus the target can be hit there as well.

Based on the above-described system, an exemplary embodiment of the presently claimed invention is now described below.

Figure 6:
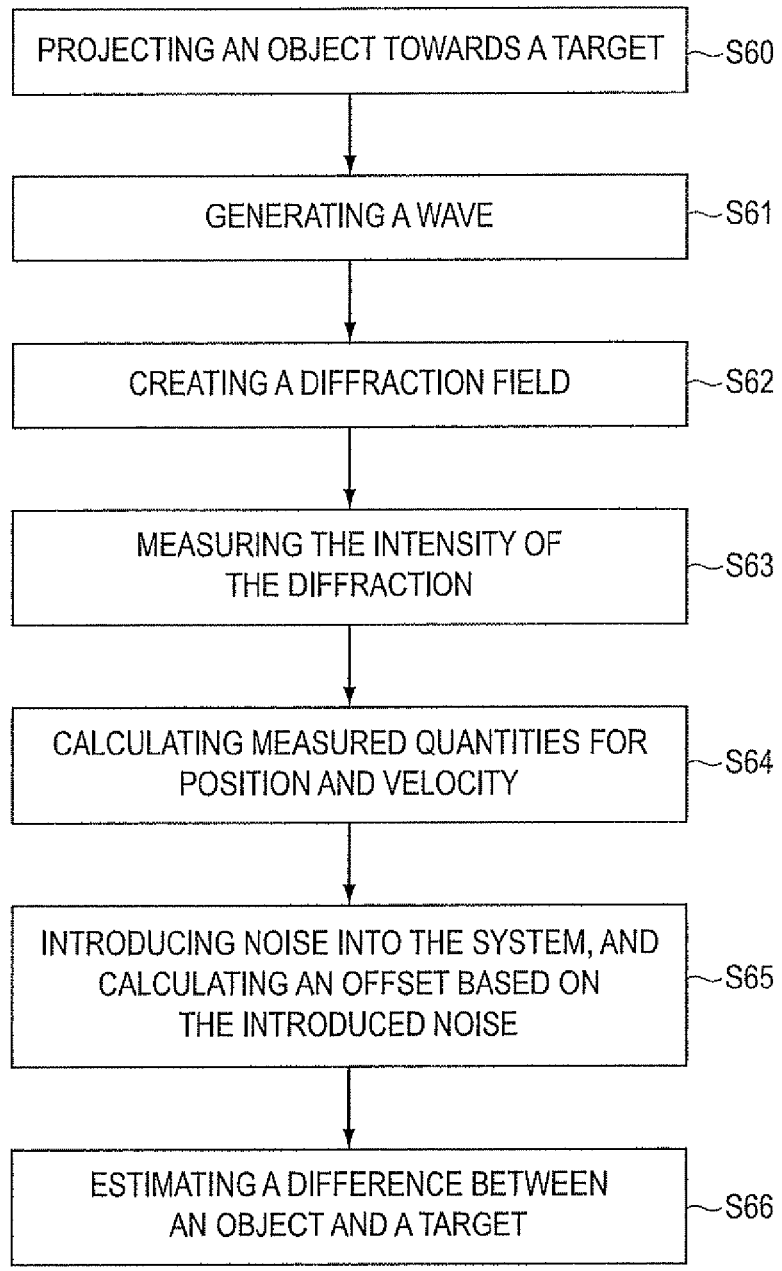
FIG. 6 is a flowchart showing an exemplary embodiment of this application.

Referring to FIG. 6, a flow chart showing a method of estimating position in relation to a target is shown. Based on the steps shown, an estimation of a relative distance between a target and a position can be ascertained; however, the disclosure contained herein is not limited to that use.

In Step 60, the projectile 60, is projected towards a target 50, for example may be a spherical object. The projectile 60, when travelling through a trajectory to the target 50 is disturbed by a noise component. Further, at various points at time, the projectile 60 has a motion equation that may be calculated using equations 1.1 and 1.2 above. In a three-dimensional system, the motion equations may be used for each of the X, Y and Z dimensions; and for velocity in the X, Y and Z directions.

In step 61, a wave 21 is generated by a wave source 20. The wave source 20 has a known position, and the wave 21 directed towards the target 50. After the wave 21 is generated, in step 62, a diffraction field 23 is generated using the target 50, with the wave source 21 being close to the target 50.

In step 63, a measurement of the intensity (or gradient of intensity) of a diffraction field 23 is taken by the projectile 60 at the point where the projectile 60 is, as it is projected towards the target 50. As explained above, one formula for calculating intensity measurements is given by equation 1.5. However, a measurement of intensity is not limited to this equation. Thus, a system within a diffraction field 23 (ideally where the field is the strongest, such as a cone representing the area of maximum field intensity) is defined by an initial point at which an object 50 is projected, to when the projection 60 reaches the target 50.

In step 64, after the measurement of the intensity of a diffraction field is obtained, various Xm and Vm measured quantities in relationship to intensity of diffraction fields calculated at various times along a pathway from an initial object's position to the time in which the object reaches the target are obtained.

In step 65, after the projectile 60 has been projected towards a target 50, the various equations used are characterized by noise. The noise components may also be used in calculating the various measured Xm and Vm quantities. Further, the noise components may be used in calculating and adjusting the motion equations 1.1 and 1.2, thus representing the various motion equations associated with all the dimensions and velocities in the various directions as "modal" densities.

In step 66, after determining that the projectile 60 is in a strong intensity portion of the diffraction field 23, the following set of calculations are done to estimate a distance from the where the projectile 60 is at from the target 50. The projectile 60 then uses this estimation and knowledge of classical motion to approach the target 50. Steps 61-66 can be achieved in a weaker field as well, with the results being less accurate.

Thus, using the various steps in FIG. 6, a more accurate prediction may be made in projecting an object to a target with noise interfering the path of the object and a minimization of dispersion between an object within a diffraction field on a target, being projected towards this target, with noise being introduced into the system to disturb the various elements is achieved.

Figure 7:
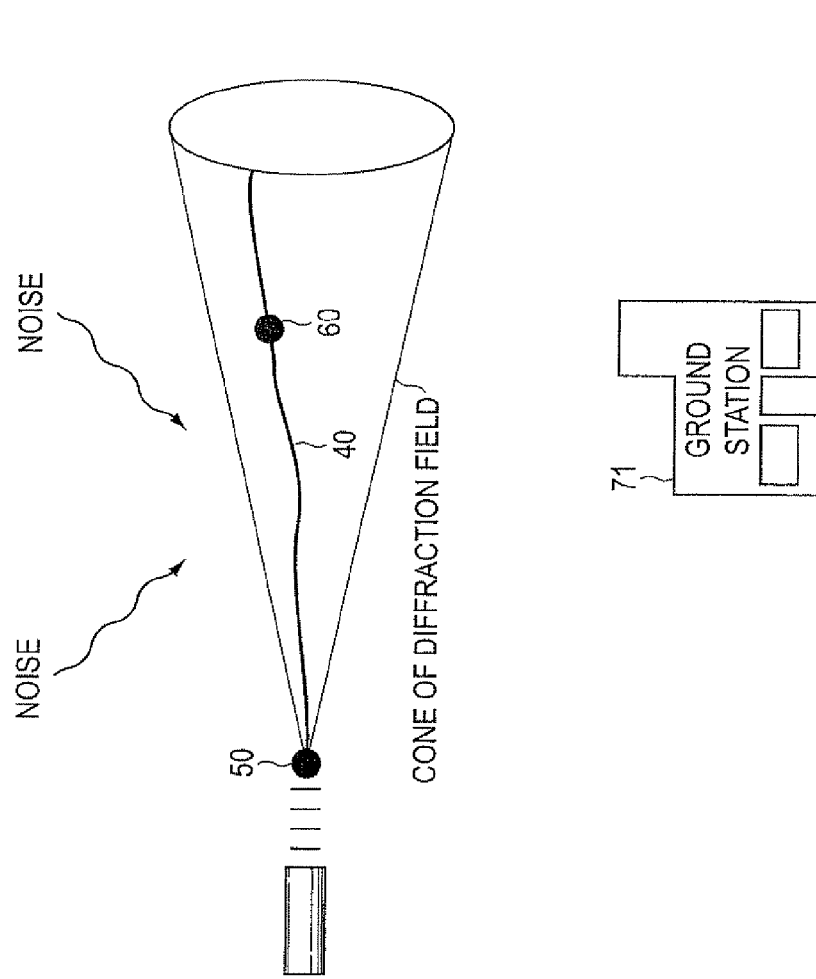
FIG. 7 is an example of the exemplary embodiment of this application.

Referring to FIG. 7, a sample application of the exemplary embodiment is presented. A ground station 71, presumably on the ground, has complete knowledge of a projectiles position-velocity at a given time. Thus, if the projectile 60 has the ability to measure a diffraction field 23 at a given time, a position-velocity of the target 50 can be estimated using the steps disclosed in FIG. 6.

Because noise, caused by random disturbances to a system is a factor in the various calculations used, the system become stochastic and thus the representation of the various locations are represented by modal densities, i.e. random variables' probability densities. Therefore, the estimated position based on the steps in FIG. 6 leads to an accurate and higher probability of a projectile 60 reaching a target 50 regardless of the noise applied to various targets.

Although a system in which only one dimension and the corresponding velocity is solved for is discussed herein, the exemplary embodiments may include multiple dimensions.

The exemplary embodiments may also include motion equations for velocity that can be solved for using similar principles and the equations disclosed herein.

In addition to the above example described in FIG. 7, in which a ground station knows the position-velocity of a projectile 60, and thus can solve for the position of the target 50, the converse also remains true. If a position-velocity of a target 50 is known, then the modal densities of a position-velocity of an projectile 60 can be ascertained (i.e. the modal density of the object at a future time).

In another embodiment, various factors from the exemplary embodiments can be modified to still obtain an estimation that is accurate in predicting various modal densities associated with the position-velocity of the target 50. For example, the source producing the diffraction pattern can be moving with a known velocity, and/or the target 50 in which the object is being projected towards can have a known velocity.

As another example, more than one of the dimensions and directions can be modified with a noise component. Thus, when performing the analysis on multiple dimensions and velocities, stochastic calculations can be used for the multiple dimensions and velocities associated with an object.

In another embodiment, the projecting of the projectile 60 towards the target 50 may include projecting the projectile 60 towards a moving target 50 in a predefined motion, while creating a diffraction field within the field generated by the source by use of a target 50, including the source moving in a way to still be able to project a field onto the target.

In another embodiment, the target 50 is moved with a translational velocity of a fixed magnitude and arbitrary direction, while moving the projectile 60 towards the target 50 is done with a translation velocity greater than the translation velocity of the target 50. In this embodiment, while the projectile 60 is moving towards the target 50, while the orbit of the projectile 60 is kept within a cone of the diffraction field.

In another embodiment, if the target is moved with a translational velocity of a fixed magnitude and arbitrary direction, the object may also move with a translational velocity greater than the translational velocity of the target, while the orbit of the object is kept within a cone of the diffraction field.

In another embodiment, the radius of the target may be based on an unknown function of time and is a random variable with uniform density.

In another embodiment, the target has an unknown velocity and an unknown position; and as done in various other embodiments, the diffraction field intensity measurements are used to predict the unknown velocity and position of the target.

The following section now details sample experiments used to show that the various embodiments can be shown to provide greater accuracy in targeting an object to a target with the use of a source to generate a source wave. The measurements are done using a computer, with samples taken at various discrete points, modeling both probability and dispersion. The various cases shown were modified to exemplify and support the methods disclosed in the various embodiments. The results presented were obtained using an Intel Celeron 1.40 GHz 192 MB RAM machine. However, the data acquisition presented is not limited to this means or processing capabilities.

Examples/Experimental Results

In a first case tested, a measurement process was used to derive classical values corresponding to classical equations of motion. Thus, the modal orbits derived were set to be exactly the same as the classical ones. These values will be referred to as fixed measurement results for the remainder of the application.

The equations used in this case are:

$$X(n+1)=X(n)+dt \cdot V(n)+dt \cdot Nx(n) \qquad (4.1.a)$$

$$V(n+1)=V(n)+dt \cdot U(n)+dt \cdot Nv(n) \qquad (4.1.b)$$

$$Xm(n+1)=I(X(n+1))+Nxm(n+1) \qquad (4.1.c)$$

$$Vm(n+1)=V(n+1)+Nvm(n+1) \qquad (4.1.d)$$

where
$U(n)=a(n) \cdot <X(n)> b(n) \cdot <V(n)>$

In the equation above, $a(n)$ and $b(n)$ are derived by classical quadratic techniques for vertical motion, and $U(n)$ is kept zero for horizontal motion. And as used before $<X(n)>$ and $<V(n)>$ are the most probable values at a time n, the modal orbit.

In this case, the noises are Gaussian, thus being constant in time. Therefore, the dispersions used in this case are:

$$DNx(n)=DNx=0.500000E-04 \quad (4.1.e.a)$$

$$DNv(n)=DNv=0.100000E-02 \quad (4.1.e.b)$$

$$DNxm(n)=DNxm=0.333333E-05 \quad (4.1.e.c)$$

$$DNvm(n)=DNxm=0.100000E-02 \quad (4.1.e.d)$$

Thus, throughout various simulations done to verify the technique described in the exemplary embodiments, various parameters are varied, such as a wave parameter K and a strength parameter STR (described below). In this case, the initial vertical velocity is set at −0.1, in order to prevent the quadratic orbit from crossing a line y=0. Further, a constant horizontal velocity was set so the system could reach an x=1 when the step was near the target. Initial dispersions were kept at 0.0004 and 0.001 for the position and velocity, respectively. Further, one may use either I(x) or gradI(x) for intensity measurements of the diffraction field. In this case, the target was at (0,0) and measurements stopped at step 49. Further, dt was set equal to constant (unless stated otherwise).

A computer program can be used to calculate the sequence of density functions for the various random variables in the system, X, V, Xm and Vm. The densities obtained are mostly bell-like, and thus a linear least square fit may be used to fit a Gaussian distribution to obtain dispersion values. This method was possible for values X and V, since the mean of those values are known due to the values being based of classical values. For the Xm and Vm values, a parabolic fitting to a Gaussian density was used to calculate the dispersion and the mean.

Calculating Vertical Coordinates and I(x) Measurements

Once the above equations were derived, a graph of dispersion versus iteration number (n) of the X probability density may be produced. These graphs, for the various embodiments, mainly show two results. Initially, a dispersion value increases to a maximum point, and then decreases. The increase occurs near the beginning, peaking to a maximum value quickly in a linear fashion, and then decreases, also quite linearly.

Further, through experimental data, it can be seen that the maximum value of dispersion increases as the strength of the field decreases. Also, the maximum value of the dispersion increases as a wave parameter k becomes smaller. It can also be seen that in a linear increasing part of the graph, the rate at which the dispersion increases is independent from field strength, initial distance and a wave parameter. Thus, at larger field strengths or wave lengths, or small initial distances from the target, the system reaches maximum dispersion at a smaller iteration number and at an earlier time, with the final dispersion being smaller or equal to the dispersion at previous times.

Thus, when the vertical position of the system in this case is reasonably far from zero, the dispersions become smaller. This is caused, because the intensity function I(y) has a peak at y=0, with two values corresponding to a given value of I, causing a broadening of probability densities. The use of a large velocity dispersions, essentially, causes a large increase in X dispersion.

In modeling the results for horizontal coordinates, it can be seen that the measurements closely track the ones previously done.

Furthermore, in testing the various cases, several different hypothetical situations were used. Some of the techniques that may be use (but not limited to) are a moving source, Isaacs Motion, having a zero initial vertical position, and changes in time scale and number of steps used. In all these cases, the same result holds true, dispersion values decrease near a target, for both position and velocity.

Figure 8:
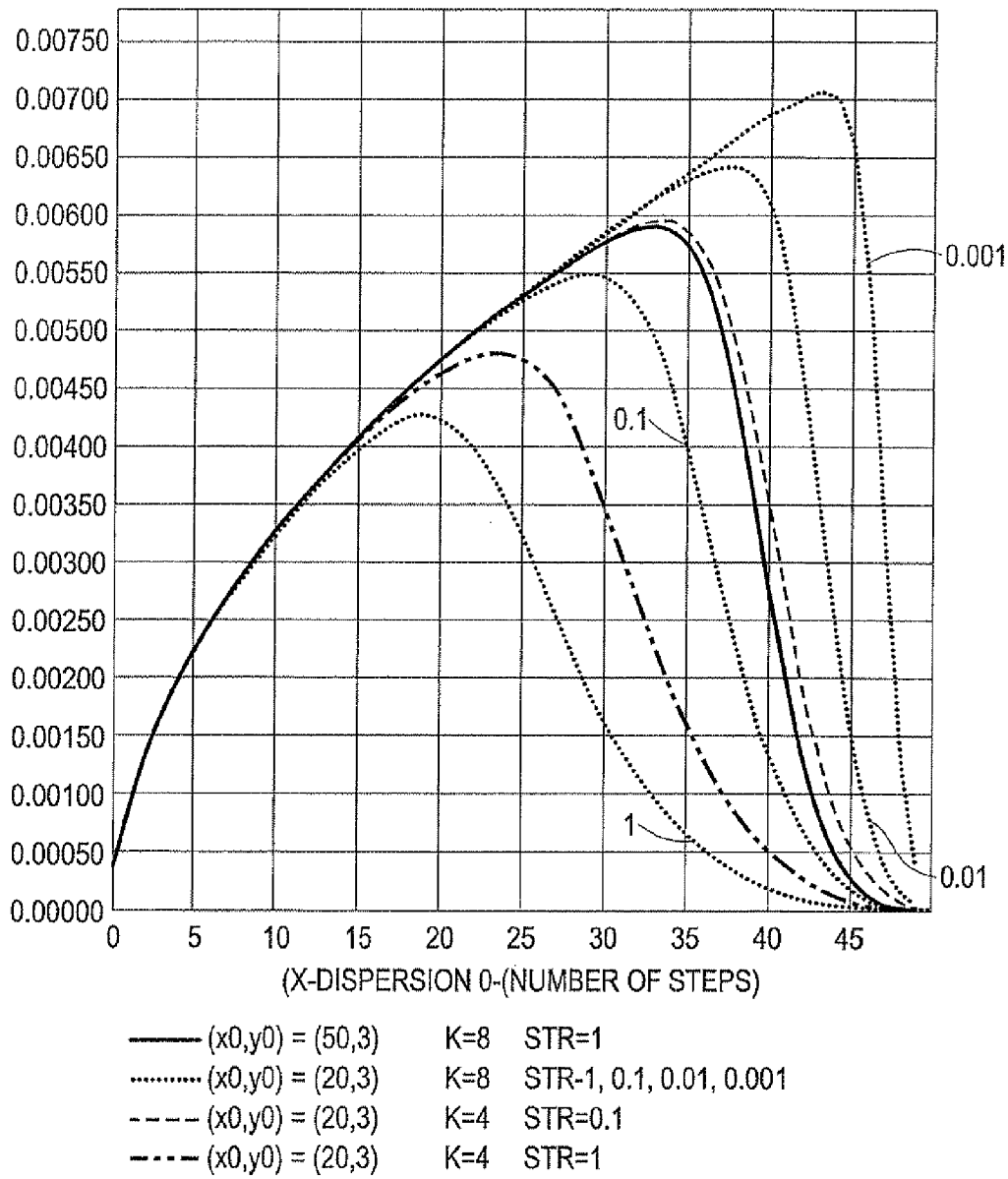
FIG. 8 is a graphical depiction of computer-generated results for an embodiment of this application.

A Representation of Other Cases Tested, Also Showing Dispersion Becomes Smaller than Target Dimensions, to Zero Coordinate Points, Near a Target:

Now referring to FIG. 8, a two-dimensional position-velocity system is analyzed. In this case, the random variable chosen was one position and the position's corresponding velocity. Like the results shown for all the cases associated with the various embodiments, the decrease of dispersion near the last steps (step at n=50) in FIG. 8 shows a collapsing of dispersion towards 0. This collapsing towards a zero indicates that an object being projected at a target has a higher chance of hitting the target. In FIG. 8, the y-axis of the graph is dispersion, while the x axis in the graph refers to the number of steps. Each step represents a different point at time, with step 0 indicating the beginning of the objects journey to the target, and step 50 being the end of the objects journey (i.e. when it reaches the target).

As shown in FIG. 8, and in the following examples depicted, a parameter STR is varied. STR is represented by the following equation:

$$STR=4Io/r^2$$

where Io is derived in the equation described in formula 1.5. The varying of strength shows that the measurement/estimation techniques depicted in the various embodiments hold true for various cases of intensity strength. Specifically, as an object approaches a target, the object reaches the target based on the assumptions disclosed in the various embodiments.

Figure 9:
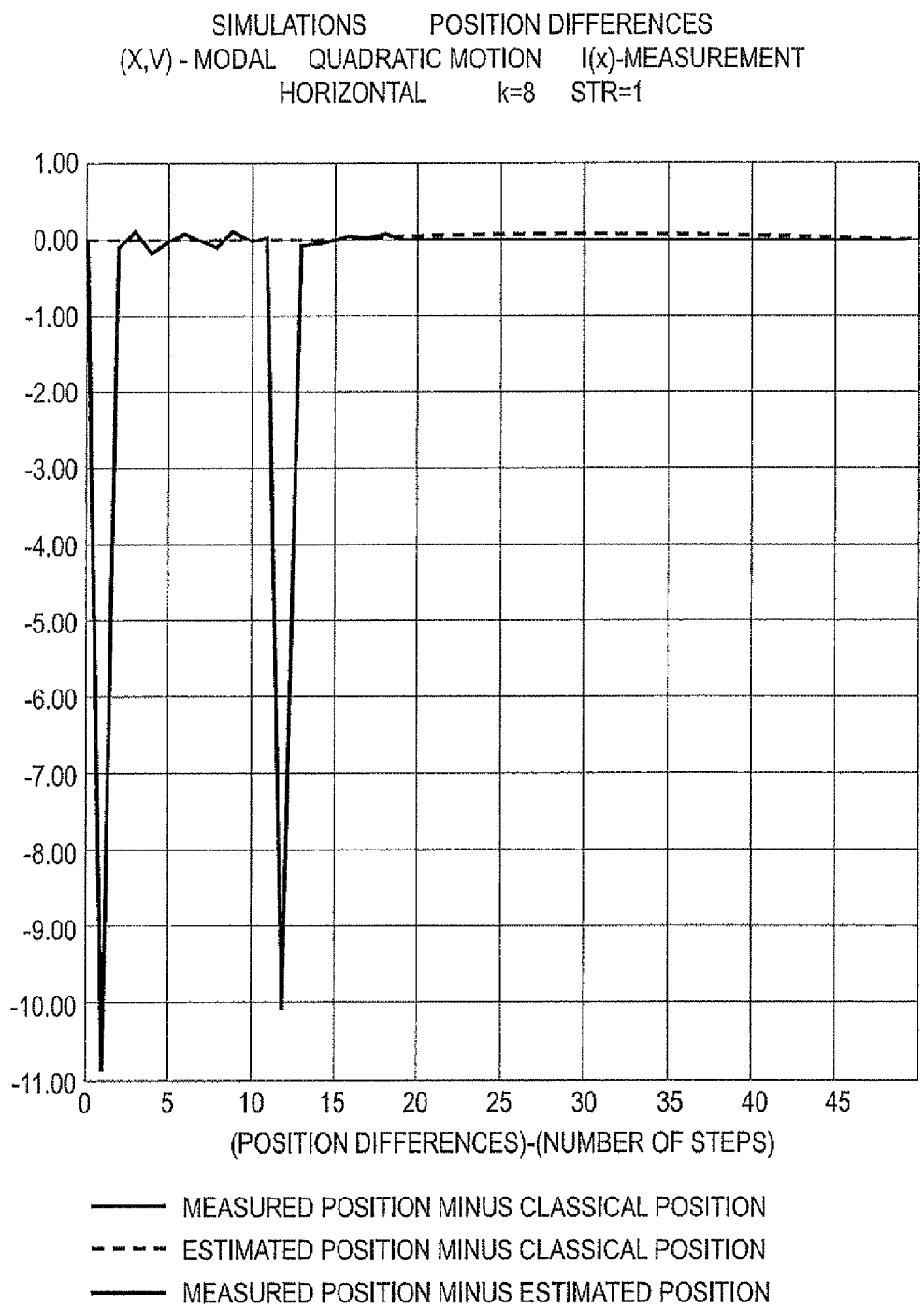
FIG. 9 is a graphical depiction of computer-generated results for an embodiment of this application.
Figure 10:
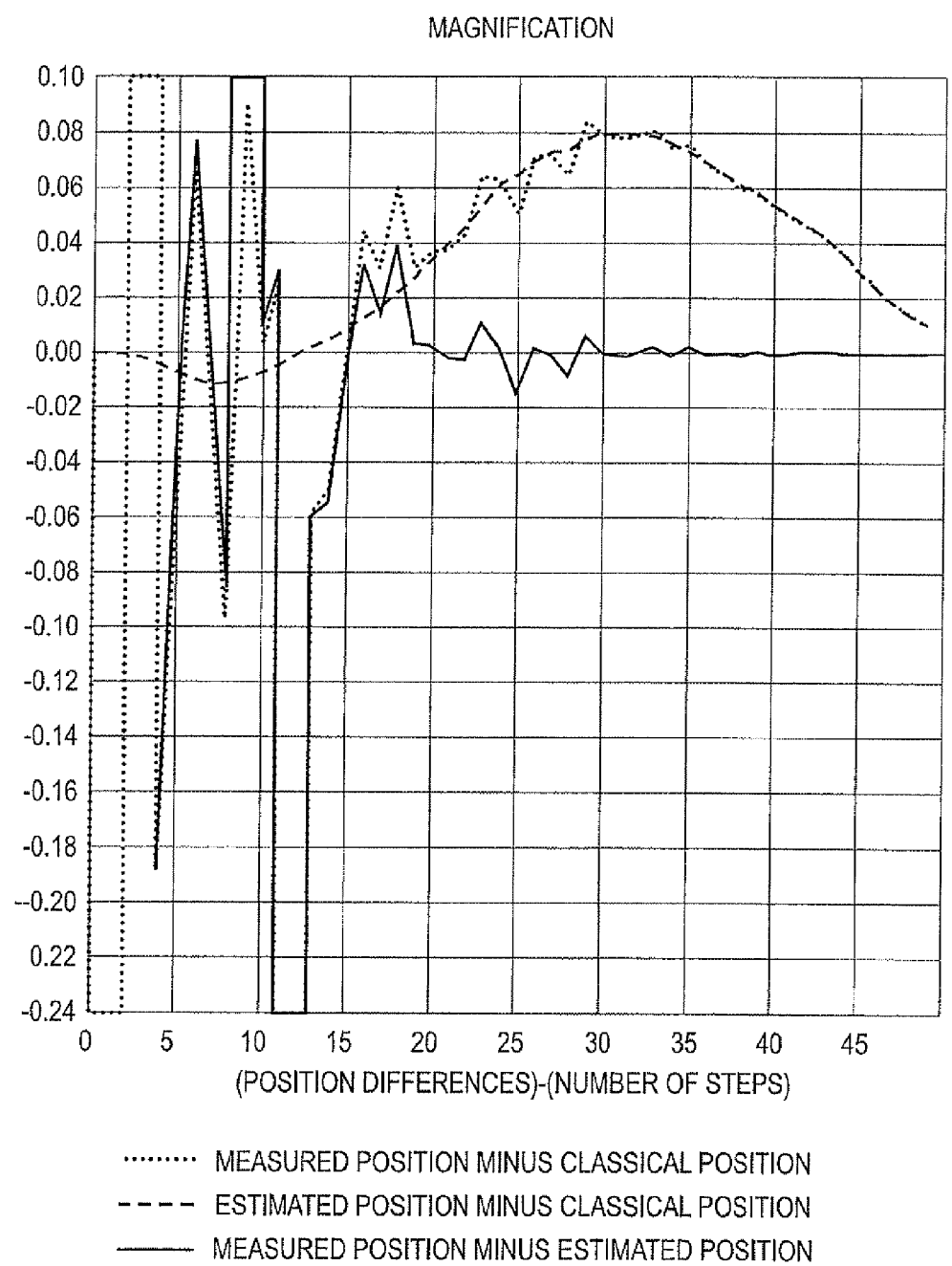
FIG. 10 is a graphical depiction of computer-generated results for an embodiment of this application.

Now referring to FIGS. 9 and 10, the random disturbances on motion and various measurements are depicted. As shown in FIG. 9, away from the target, a target estimated position is close to classical positions, with the measured position straying. Nearer to the target, the estimated position get closer to the measure position. Thus, this leads to the conclusion that nearer to the target, there is less of a need perform calculations, with a single measurement of diffraction field sufficient to estimate a position. Contrarily, away from the target, a measurement, without using the calculations of modal theory, results in much more varied "estimations" of position. FIG. 10 is a magnification of FIG. 9.

Figure 11:
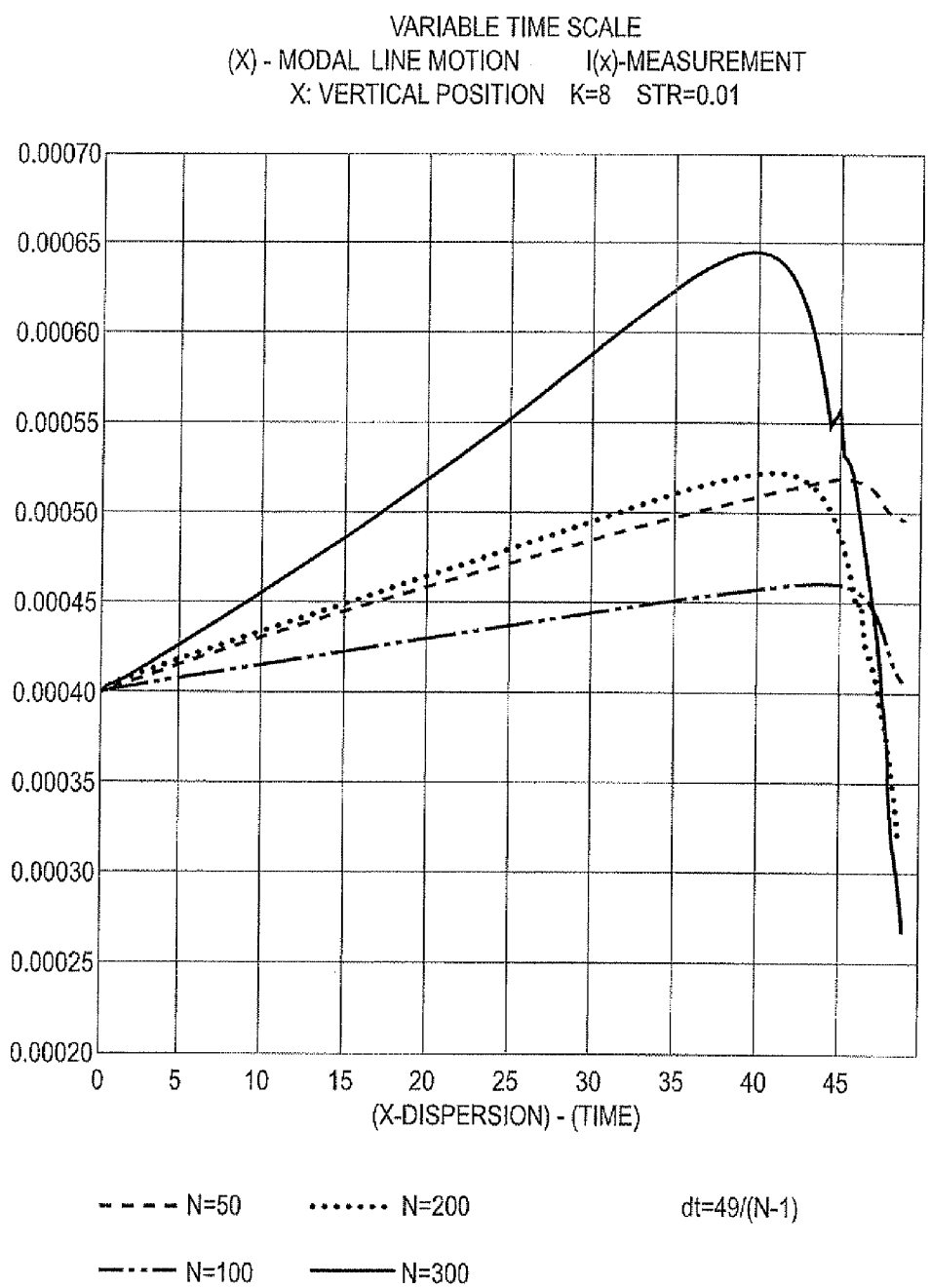
FIG. 11 is a graphical depiction of computer-generated results for an embodiment of this application.

Now referring to FIG. 11, a one dimensional system in cases where one uses more steps to approach the target is shown. The results show that as one increases the number of steps, the final dispersion becomes smaller.

Further, a conclusion that may be reached, and as described above, is that an alternative embodiment to the exemplary embodiment is to perform an estimation for one dimension and use and apply the same techniques for a multi-dimensional system.

Figure 12:
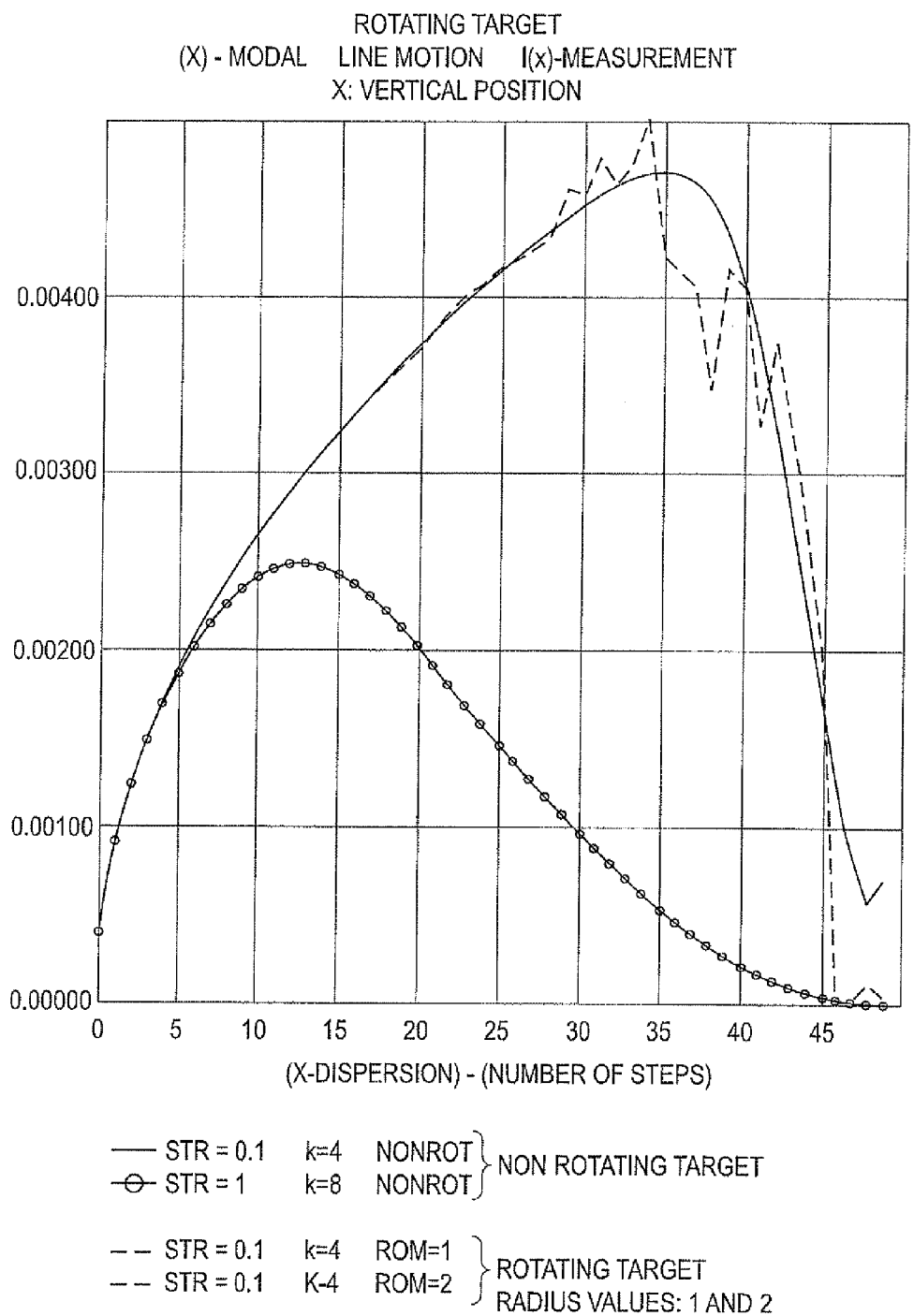
FIG. 12 is a graphical depiction of computer-generated results for an embodiment of this application.

Now referring to FIGS. 12 and 13, a graphical representation showing a variable radius target, such as a case using a rotating target of arbitrary shape. Once again, the results show that the regardless of a target having rotation, dispersion is reduced to almost zero at a step in which the projectile reaches a target.

Further, a radius of the target may be set to be a variable. This is done to model a target that rotates. A uniform probability distribution is assigned to the target radius. This is done to exemplify the fact that the object being projected does not have any knowledge of the target's radius. In cases where the target is kept at a constant radius, it can be shown that the values of dispersion follow or closely track the values of dispersion as shown above. In cases where the target rotates, the values of dispersion fall between the values of dispersions associated with the minimum radius and the maximum radius.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for measuring the motion of an object directed to at least one target using at least one source that generates wave fields in a non-vacuum stochastic system having a plurality of objects, the at least one object generating at least one diffraction field in the path of a propagating wave field created by the source, and at least one object is a projectile or a measurement instrument that can be driven towards the target, the measurement instrument being configured to measure at least one diffraction field quantity, the source, the at least one measurement instrument or the at least one projectile being configured to communicate with each other, and the non-vacuum stochastic system including: (1) a discrete time variable n, (2) a state vector z(n) for each time n, (3) at least one measurement vector zm(n) that includes a set of measurement variables measuring at least one diffraction field quantity, (4) at least one motion noise vector and at least one measurement noise vector being independent and uncorrelated in time, (5) a set of motion equations, (6) a set of measurement equations, and (7) a probability density for an initial state vector z(0) at an initial time, the method comprising:

measuring at least one diffraction field quantity, the measurement being disturbed by noise, and determining if the object disturbed by noise is within a strong portion of the diffraction field;

using the at least one diffraction field quantity to determine at least one state variable of the at least one object; and calculating the conditional probability density of the at least one state variable at a time n, given measurements up to the time n:

$$Pn(z(n)\,|\,M(n)) = \frac{1}{Nn} \cdot Qn(zm(n)\,|\,z(n)) \cdot Fn(z(n))$$

wherein $Pn(z(n)|M(n))$ is the conditional probability density of state variables $z(n)$ at time n, $M(n)$ denotes a vector of all measurement variables $zm(i)$ up to time n, $Nn$ denotes a normalization factor at time n, $Qn(zm(n)|z(n))$ denotes the conditional probability of the at least one measurement vector $zm(n)$ given the at least one state vector $z(n)$, and $Fn(z(n))$ is an expression provided by:

$$Fn(z(n)) = \int dz(n-1) \Pi n(z(n)|z(n-1)) \cdot Q_{n-1}(zm(n-1)|z(n-1)) \cdot F_{n-1}(z(n-1))$$

wherein $\Pi n(z(n)|z(n-1))$ is the conditional probability of the at least one state vector $z(n)$ given a state vector $z(n-1)$, and $Q_{n-1}(zm(n-1)|z(n-1))$ is the conditional probability of the at least one measurement vector $zm(n-1)$ given a state vector $z(n-1)$, the variables $\Pi n$, $Qn$, and $Q_{n-1}$ being calculated based on equations of motion, measurements, and the probability densities of the at least one state variable.

2. The method as claimed in claim 1, wherein the at least one diffraction field quantity includes: a component of a field tensor, a component of an energy momentum tensor, or a function of the field tensor and the energy momentum tensor.

3. The method as claimed in claim 1, wherein the measurement instrument is configured to be a projectile.

4. The method as claimed in claim 1, wherein the at least one state variable includes: a measured position value of the at least one object, a radius of the target, or a measured velocity value of the at least one object.

5. A method for measuring the motion of an object directed to at least one target using at least one source that generates wave fields in a non-vacuum stochastic system having a plurality of objects, the at least one object generating at least one diffraction field in the path of a propagating wave field created by the source, and at least one object is a projectile or a measurement instrument that can be driven towards the target, the measurement instrument being configured to measure at least one diffraction field quantity, the source, the at least one measurement instrument or the at least one projectile being configured to communicate with each other, and the non-vacuum stochastic system including: (1) a discrete time variable n, (2) a state vector z(n) for each time n, (3) at least one measurement vector zm(n) that includes a set of measurement variables measuring at least one diffraction field quantity, (4) at least one motion noise vector and at least one measurement noise vector being independent and uncorrelated in time, (5) a set of motion equations, (6) a set of measurement equations, and (7) a probability density for an initial state vector z(0) at an initial time, the method comprising:

measuring the at least one object that is in a region where the diffraction field is non-zero, the measurement being disturbed by noise;

using the at least one diffraction field quantity to determine at least one state variable of the at least one object; and calculating the conditional probability density of the at least one state variable at a time n, given measurements up to the time n:

$$Pn(z(n)\,|\,M(n)) = \frac{1}{Nn} \cdot Qn(zm(n)\,|\,z(n)) \cdot Fn(z(n))$$

wherein $Pn(z(n)|M(n))$ is the conditional probability density of state variables $z(n)$ at time n, $M(n)$ denotes a vector of all measurement variables $zm(i)$ up to time n, $Nn$ denotes a normalization factor at time n, $Qn(zm(n)|z(n))$ denotes the conditional probability of the at least one measurement vector $zm(n)$ given the at least one state vector $z(n)$, and $Fn(z(n))$ is an expression provided by:

$$Fn(z(n)) = \int dz(n-1) \Pi n(z(n)|z(n-1)) \cdot Q_{n-1}(zm(n-1)|z(n-1)) \cdot F_{n-1}(z(n-1))$$

wherein $\Pi n(z(n)|z(n-1))$ is the conditional probability of the at least one state vector $z(n)$ given a state vector z(n−1), and $Q_{n-1}(zm(n-1)|z(n-1))$ is the conditional probability of the at least one measurement vector zm(n−1) given a state vector z(n−1), the variables Πn, Qn, and $Q_{n-1}$ being calculated based on equations of motion, measurements, and the probability densities of the at least one state variable.

6. The method as claimed in claim 5, wherein the at least one diffraction field quantity includes; a component of a field tensor, a component of an energy momentum tensor, or a function of the field tensor and the energy momentum tensor.

7. The method as claimed in claim 5, wherein the measurement instrument is configured to be a projectile.

8. The method as claimed in claim 5, wherein the at least one state variable includes: a measured position value of the at least one object, a radius of the target, or a measured velocity value of the at least one object.

* * * * *